(12) United States Patent
Singh et al.

(10) Patent No.: US 7,675,911 B2
(45) Date of Patent: Mar. 9, 2010

(54) METHOD AND SYSTEM FOR ACKNOWLEDGEMENTS IN WIRELESS COMMUNICATIONS

(75) Inventors: Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 427 days.

(21) Appl. No.: 11/713,311

(22) Filed: Mar. 1, 2007

(65) Prior Publication Data

US 2008/0212612 A1     Sep. 4, 2008

(51) Int. Cl.
*H04L 12/56* (2006.01)
*H04L 12/54* (2006.01)
*G08C 25/02* (2006.01)

(52) U.S. Cl. .................. 370/389; 370/428; 714/748

(58) Field of Classification Search ................ None
See application file for complete search history.

(56) References Cited

U.S. PATENT DOCUMENTS

| | | | |
|---|---|---|---|
| 2006/0018332 A1* | 1/2006 | Kakani et al. | 370/428 |
| 2006/0034274 A1* | 2/2006 | Kakani et al. | 370/389 |
| 2007/0230493 A1* | 10/2007 | Dravida et al. | 370/412 |
| 2008/0130538 A1* | 6/2008 | Raissinia et al. | 370/310 |

OTHER PUBLICATIONS

Stephens, A.; and Coffey, S., "IEEE P802.11, Wireless LANs, Joint Proposal: High throughput extension to the 802.11 Standard: MAC," IEEE 802.11-05/1095r2, Nov. 2005, pp. 1-37.
IEEE P802.11e/D13.0 (Jan. 2005), Part 11: Wireless LAN Medium Access Control (MAC) and Physical Layer (PHY) specification: "Amendment: Medium Access Control (MAC) Quality of Service (QoS) Enhancements," LAN/MAN Committee of the IEEE Computer Society, 198 pages.
802.11 Working Group of the 802 Committee, "Draft Amendment to Standard for Information Technology-Telecommunications and information exchange between systems-Local and metropolitan area networks-Specific requirements-Part 11: Wireless LAN Medium Access Control (MAC) and Physical Layer (PHY) specifications: Enhancements for Higher Throughput." IEEE P802.11n/D1.0 (Mar. 2006), pp. 1-335.

* cited by examiner

*Primary Examiner*—Ricky Ngo
*Assistant Examiner*—Clemence Han
(74) *Attorney, Agent, or Firm*—Kenneth L. Sherman, Esq.; Michael Zarrabian, Esq.; Myers Andras Sherman LLP (57) ABSTRACT

A packet communication process for a wireless system that includes a sender and a receiver, is provided. The packet communication process dispenses with the need to send multiple block acknowledgments, one per Traffic Identifier (TID), from the receiver to the sender. This involves aggregating multiple MPDUs having a plurality of different TIDs; for each TID, generating a BAR to request an acknowledgment for one or more MPDUs with that TID from the receiver; transmitting the aggregated MPDUs and the BARs from the sender to the receiver over a wireless channel; receiving the aggregated MPDUs and the BARs at the receiver; in response to the BARs, generating a single block acknowledgement that includes an acknowledgment for each MPDU with a different TID; and transmitting the single block acknowledgement to the sender.

48 Claims, 8 Drawing Sheets

(PRIOR ART)

Bits:    B0-B11    B12-B15

(PRIOR ART)

(PRIOR ART)

METHOD AND SYSTEM FOR ACKNOWLEDGEMENTS IN WIRELESS COMMUNICATIONS

FIELD OF THE INVENTION

The present invention relates to wireless communications and in particular, to a method of using block acknowledgements in wireless communications.

BACKGROUND OF THE INVENTION

In many wireless communication systems, a frame structure is used for data transmission between a transmitter and a receiver. For example, the IEEE 802.11 standard uses frame aggregation in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PLCP (Physical Layer Convergence Protocol) Service Data Unit (PSDU) and is transferred to a PHY layer in the transmitter to attach a PHY header (i.e., a PHY preamble) thereto to construct a PLCP Protocol Data Unit (PPDU). The PHY header includes parameters for determining a transmission scheme including a coding/modulation scheme.

Figure 1:
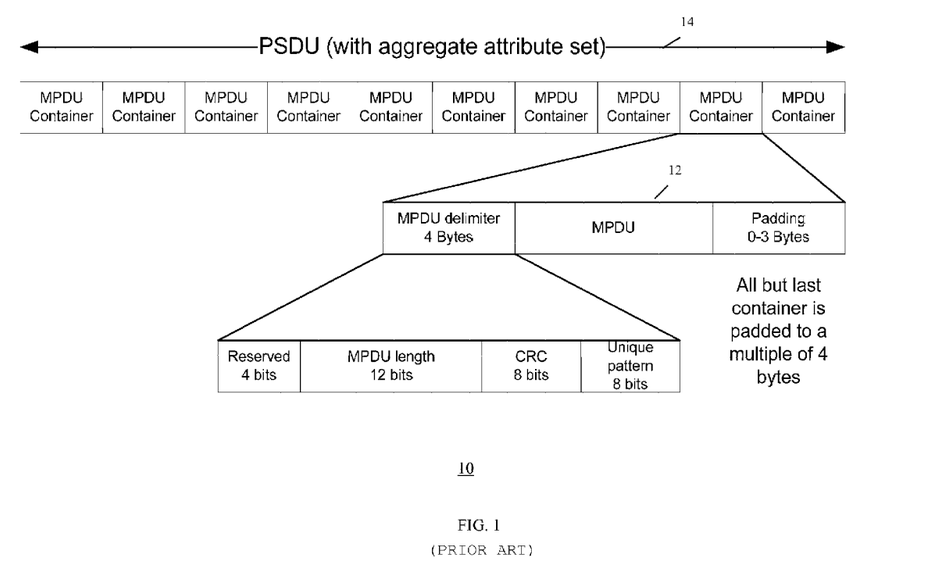
FIG. 1 shows a conventional A-MPDU frame.

An IEEE 802.11n specification (IEEE P802.11n/D1.0 (March 2006), "Amendment: Wireless LAN MAC and PHY specifications: Enhancement for Higher Throughputs"), incorporated herein by reference, provides an aggregation scheme called A-MPDU (Aggregate-Medium Access Control (MAC) Protocol Data Unit). As shown in FIG. 1, the purpose of an A-MPDU 10 is to aggregate multiple MPDUs 12 together and to transport them from a sender to a receiver in a single PLCP Service Data Unit (PSDU) 14.

Figure 2:
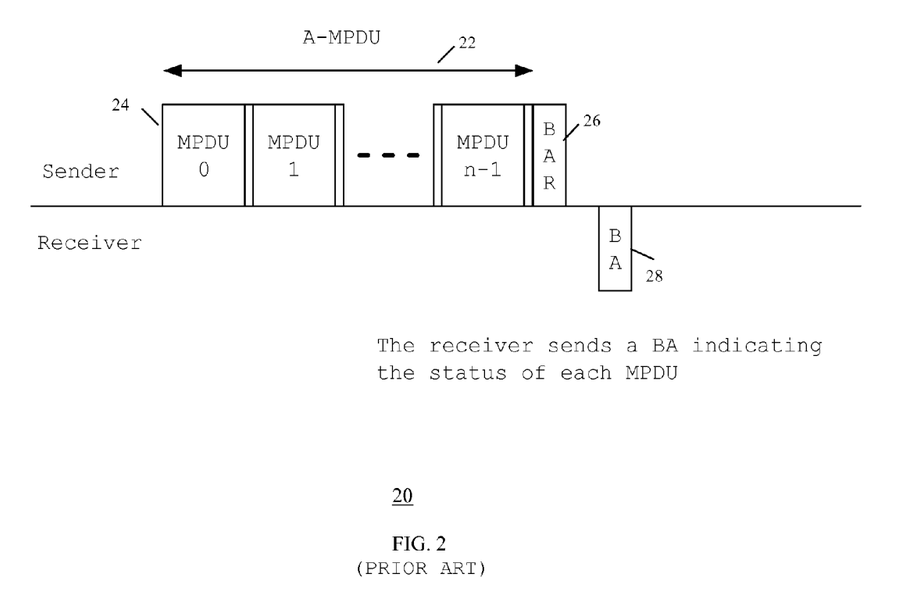
FIG. 2 shows a conventional A-MPDU sequence.

FIG. 2 shows an example communication sequence 20 wherein an A-MPDU 22 is transmitted from a sender (transmitter) to a receiver, over a wireless channel. The sender transmits multiple data MPDUs 24 in an A-MPDU 22 followed by a block acknowledgement request (BAR) frame 26. On receipt of the A-MPDU 22 and the BAR 26, the receiver generates a block acknowledgement (BA) frame 28 in response and transmits the BA 28 to the sender over the wireless channel. The BA 28 indicates the receipt status of each MPDU in the received A-MPDU.

In general, both the BAR and BA frames have a subfield providing a Traffic Identifier (TID) for data MPDUs. There is a one-to-one mapping between a TID and a BAR frame. There are 16 possible TID values, in which 8 identify as prioritized Traffic Categories (TC) and the other 8 identify as parameterized Traffic Streams (TS).

Figure 3:
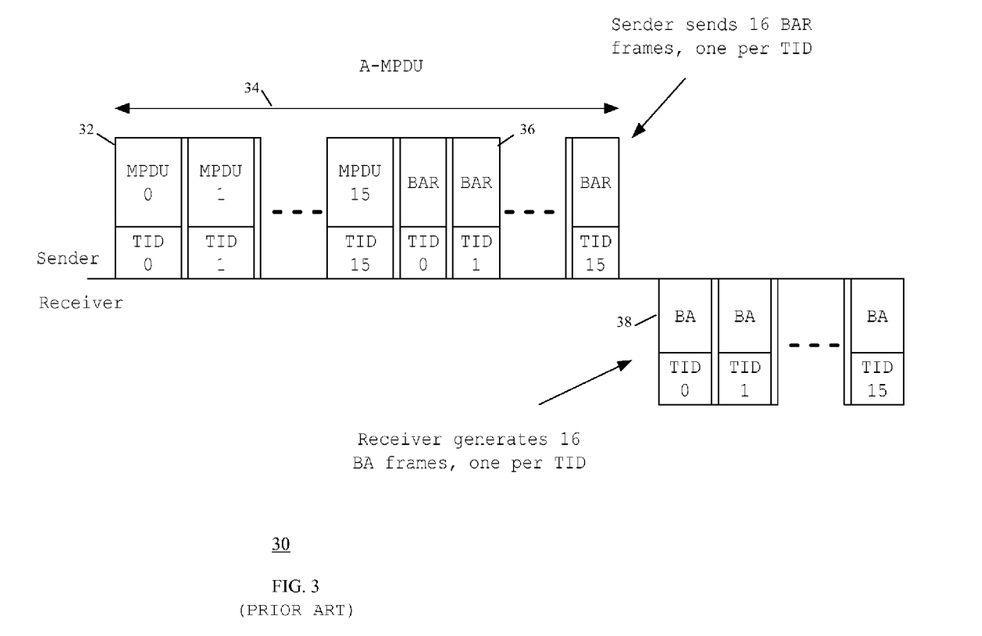
FIG. 3 shows a conventional A-MPDU sequence with MPDUs from different TIDs.
Figure 4:
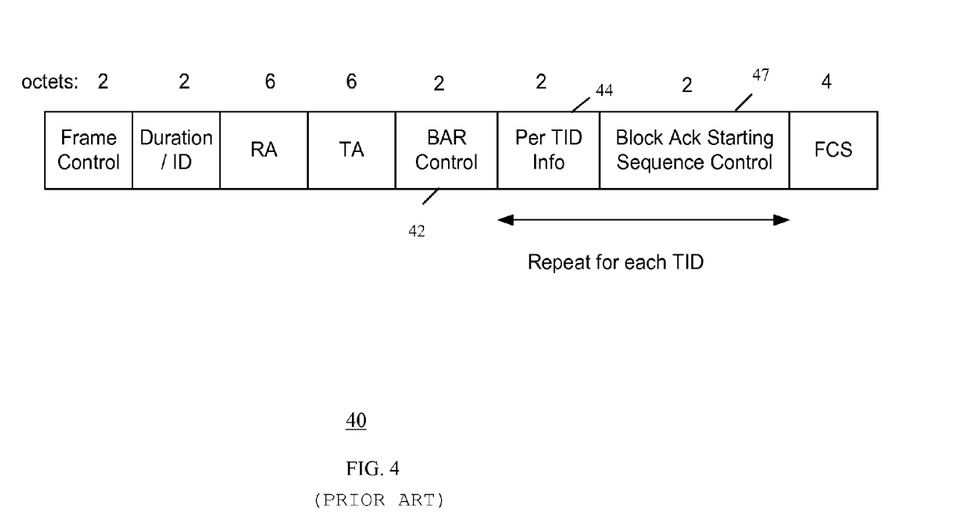
FIG. 4 shows a conventional Multi-TID BAR frame.
Figure 5:
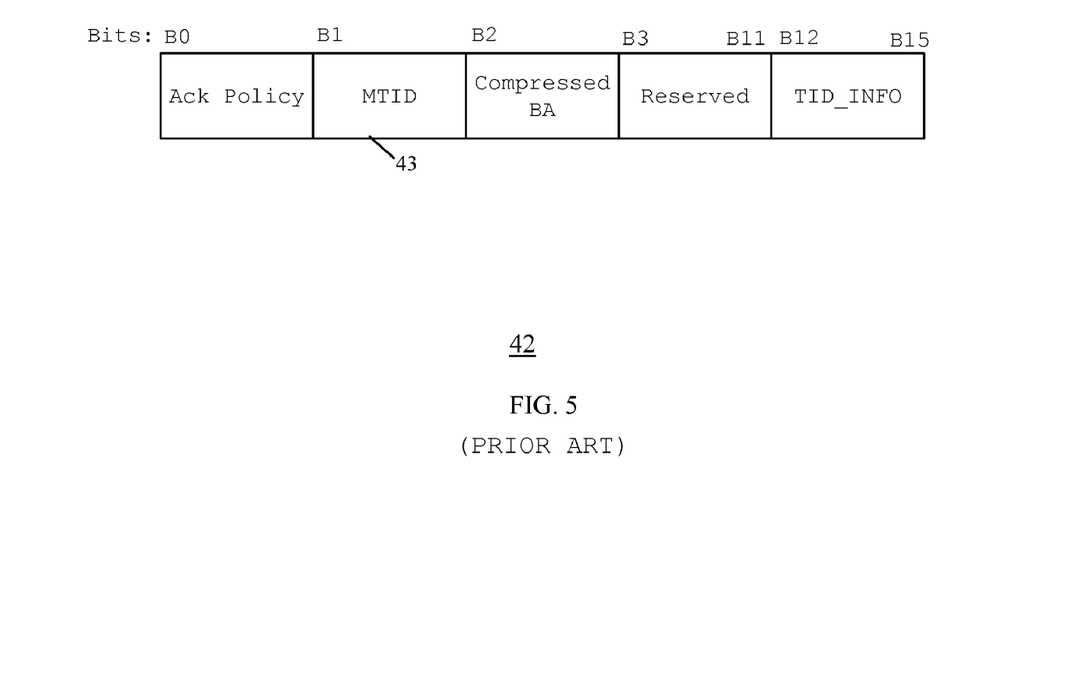
FIG. 5 shows a conventional BAR control field.

FIG. 3 shows an example communication sequence 30 for aggregating 16 data MPDUs 32 in an A-MPDU 34. The sender sends 16 BAR frames 36, one per TID. The receiver generates 16 BA frames 38, one per TID. FIG. 4 shows a multiple TID BAR (Multi-TID BAR (MTID)) frame 40, and FIG. 5 shows the details of a BAR control field 42 in the Multi-TID BAR frame format 40. Table 1 below presents the meaning of different fields of the BAR control frame of FIG. 5.

TABLE 1

BAR Control Field Meaning

| Multi-TID | Compressed BA | BAR frame variant | Comment |
|---|---|---|---|
| 0 | 0 | Simple BlockACKReq | |
| 0 | 1 | Compressed BlockACKReq | No fragmentation |
| 1 | 0 | Reserved | |
| 1 | 1 | Multi-TID BlockACKReq | No fragmentation |
| ACK Policy | | 0 | Normal Acknowledgement |
| | | 1 | No Acknowledgement |
| TID_INFO | | With the Multi-TID BlockACKReq, the meaning of this field is to indicate the number of TIDs + 1 | |

Figure 6:
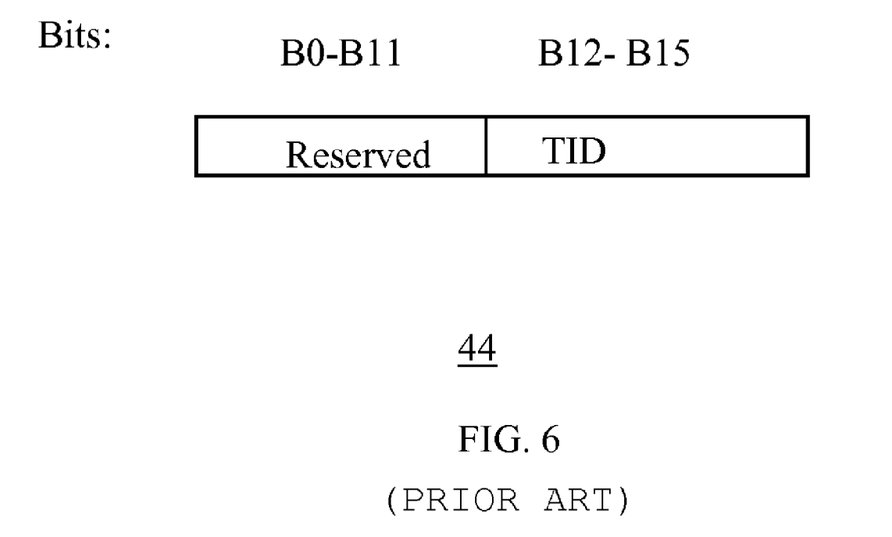
FIG. 6 shows a conventional Per TID Info field.
Figure 7:
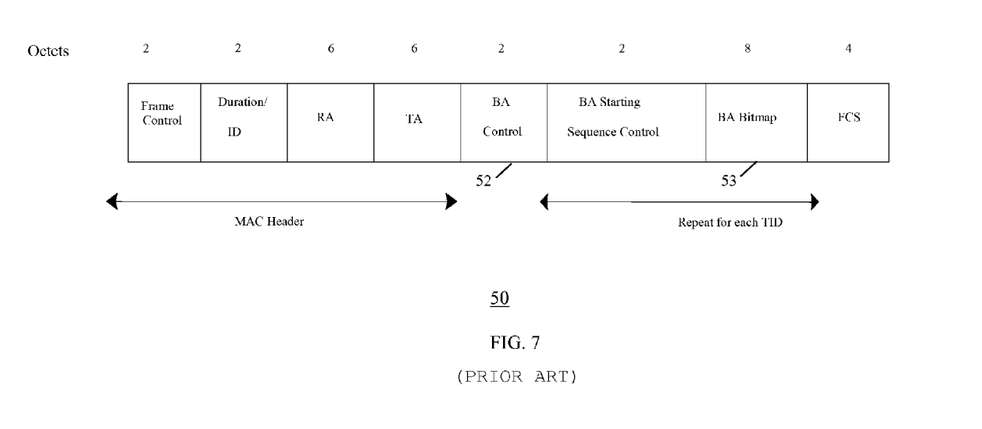
FIG. 7 shows a conventional per TID block acknowledgement frame.
Figure 8:
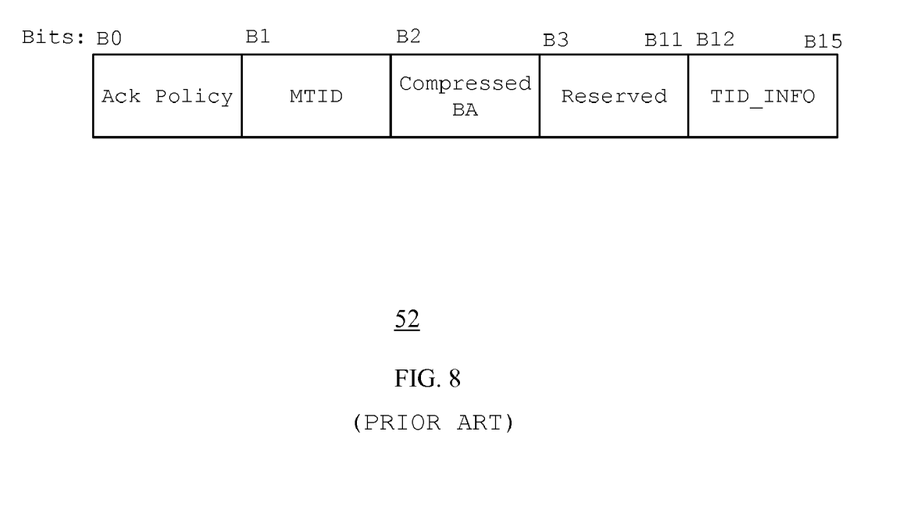
FIG. 8 shows a conventional BA control field.

FIG. 6 shows the details of a Per TID Info field 44 in the Multi-TID BAR frame format 40. FIG. 7 shows the details of a Multi-TID BA frame 50, and FIG. 8 shows the details of a BA control field 52 in the Multi-TID BA frame 50.

In the above approaches, the receiver generates multiple (immediate) BA frame responses for different TIDs, wherein the BA frame responses are transmitted back to the sender. There is a one-to-one mapping between a TID and a BA frame. This leads to processing complexity and channel bandwidth waste. As such, there is need for an acknowledgment scheme that dispenses with the need to send multiple block acknowledgments, one per TID, from a receiver to a sender.

BRIEF SUMMARY OF THE INVENTION

The present invention provides a method and a system for packet communication in a wireless communication system including a sender and a receiver, which dispenses with the need to send multiple block acknowledgments, one per TID, from the receiver to the sender. This involves aggregating multiple MPDUs having a plurality of different TIDs; for each TID, generating a BAR to request an acknowledgment for one or more MPDUs with that TID from the receiver; transmitting the aggregated MPDUs and the BARs from the sender to the receiver over a wireless channel; receiving the aggregated MPDUs and the BARs at the receiver; in response to the BARs, generating a single block acknowledgement that includes an acknowledgment for each MPDU with a different TID; and transmitting the single block acknowledgement to the sender.

The present invention further provides packet communication in a wireless communication system including a sender and a receiver, by aggregating multiple MPDUs having a plurality of different TIDs; generating a BAR without a PER TID_INFO field, to request an acknowledgment for each MPDU from the receiver; transmitting the aggregated MPDUs and the BAR from the sender to the receiver over a wireless channel; receiving the aggregated MPDUs and the BAR at the receiver; in response to the BAR, generating a single block acknowledgement that includes an acknowledgment for each MPDU with a different TID; and transmitting the single block acknowledgement to the sender.

These and other features, aspects and advantages of the present invention will become understood with reference to the following description, appended claims and accompanying figures.

BRIEF DESCRIPTION OF THE DRAWINGS

FIG. 9 shows an example Multi-TID BAR frame for a Multi-TID-BA scheme, according to another embodiment of the present invention.

FIG. 10 shows an example Multi-TID BA signaling method using the Multi-TID BAR control field, according to another embodiment of the present invention.

FIG. 11 shows a Multi-TID BA frame used in a Multi-TID-BA scheme, according to another embodiment of the present invention.

FIG. 12 shows a TID-Bitmap field, according to another embodiment of the present invention.

FIG. 13 shows an example Multi-TID BA signaling using a Multi-TID BA control field, according to another embodiment of the present invention.

FIG. 14 shows a process for operation of a wireless sender using a Multi-TID-BA scheme, according to another embodiment of the present invention.

FIG. 15 shows a process for operation of a wireless receiver using in a Multi-TID-BA scheme, according to another embodiment of the present invention.

FIG. 16 shows a variable length BAR frame, according to another embodiment of the present invention.

FIG. 17 shows a variable length BA frame, according to another embodiment of the present invention.

FIG. 18 shows an example of a variable length Multi-TID BA frame, according to another embodiment of the present invention.

FIG. 19 shows a process for operation of a wireless sender, according to another embodiment of the present invention.

FIG. 20 shows a process for operation of a wireless receiver, according to another embodiment of the present invention.

FIG. 21 shows a block diagram of a wireless communication system implementing a Multi-TID-BA scheme, according to another embodiment of the present invention.

DETAILED DESCRIPTION OF THE INVENTION

The present invention provides a method and a system for packet communication in wireless communications, wherein a sender transmits multiple MPDUs with different TIDs to a receiver, and the receiver generates and transmits a single block acknowledgement frame back to the sender to acknowledge (ACK) the multiple MPDUs with different TIDs.

In an implementation for IEEE 802.11 wireless communications, the sender transmits an A-MPDU including multiple MPDUs with a plurality of TIDs to the receiver, and the receiver generates a responsive block acknowledgment frame that includes Multiple Block Acknowledgements (Multi-BA) acknowledging the MPDUs in the received A-MPDU.

There can be multiple MPDUs in the A-MPDU for each TID. A Multi-TID BAR is transmitted from the sender to the receiver for each TID. The receiver generates a BA frame including Multi-TID BA acknowledging the MPDUs with different TIDs. One Multi-TID BA is transmitted from the receiver to the sender to acknowledge multiple data MPDUs belonging to different TIDs. In one example, a Block ACK bitmap per TID provides an acknowledgment for each MPDU per TID in the A-MPDU.

In another implementation, MPDUs having a plurality of different TIDs are aggregated, and a BAR without a PER TID_INFO field, is generated to request an acknowledgment for each MPDU from the receiver. In response to the BAR, the receiver generates a single block acknowledgement that includes an acknowledgment for each MPDU with a different TID.

In either case, data MPDUs from different TIDs can be aggregated together in one A-MPDU and transmitted from the sender to the receiver, wherein the receiver responds with a single block acknowledgement for the A-MPDU. For instance, several VoIP, video streaming and data packets can be aggregated in an A-MPDU. One Multi-TID BA is transmitted from the receiver to the sender to acknowledge multiple data MPDUs belonging to different TIDs.

Example implementations of the Multi-TID-BA scheme according to the present invention are described below.

FIG. 9 shows an example for a Multi-TID BAR frame 60 used in a Multi-TID-BA scheme, according to an embodiment of the present invention, wherein the conventional Per TID Info subfield 44 (FIG. 4) is eliminated.

In a Multi-TID-BA signaling scheme according to the present invention, the sender uses a Multi-TID BAR control field 62 in the Multi-TID BAR frame 60, to signal the receiver to generate only one block acknowledgement frame (i.e., a Multi-TID BA frame).

FIG. 10 shows the details of the BAR control field 62 in the Multi-TID BAR frame 60, wherein a sender uses a Multi-TID-BA signaling scheme to signal the receiver to generate only one block acknowledgement frame. In the Multi-TID BAR frame 60, a compressed BA subfield 64 (bit B2), is copied into a reserved field 66 (bit B3) and the compressed BA subfield 64 is set to 0, as shown diagrammatically in FIG. 10.

The TID_INFO subfield 68 in the Multi-TID BAR frame 60 indicates the actual value of a TID. The TID_INFO subfield 68 (bits B12, B13, B14, B15) is copied twice into the reserved fields 70 and 72 (bits B4, B5, B6, B7 and B8, B9, B10, B11, respectively).

Based on the above signaling Multi-TID BAR control field 62 from the data sender, the receiver detects the presence of the Multi-TID-BA scheme in the Multi-TID BAR frame 60 (FIG. 9). As shown in FIG. 11, the receiver then generates a single Multi-TID BA frame 80 in response to the Multi-TID BAR frame 60.

The Multi-TID BA frame 80 includes a block acknowledgment bitmap field 81. For each TID 83, the block acknowledgment bitmap field 81 includes: a Block ACK Starting Sequence Control field 82 (2 bytes) and a Block ACK Bitmap field 84 (8 bytes). The acknowledgment bitmap 81 is of fixed length of 16×(2+8)=160 bytes. For any TID not present in the received data A-MPDU frame, the receiver sets the corresponding Block ACK Starting Sequence Control subfield 82 and the Block ACK Bitmap subfield 84 to zero. This signals the sender that the receiver did not receive any data corresponding to the TID in the transmitted A-MPDU frame. The receiver processes other TIDs which are present in the A-MPDU frame received from the sender, as when the receiver generates a BA for each of these TIDs.

The Multi-TID BA frame 80 further includes a TID-Bitmap field 86, which is shown in more detail in FIG. 12. The TID-Bitmap field 86 comprises a two-byte field as a bitmap to indicate the presence or the absence of each TID in the received A-MPDU. Bit i in the TID-Bitmap field 86 indicates the presence or the absence of TID i in the received A-MPDU. For example, when bit i is set to 1, that indicates the presence of TID i. Similarly, when bit j is set to 0 that indicates the absence of TID j.

FIG. 13 shows an example of a Multi-TID-BA signaling scheme using a Multi-TID BA control field 90, compared to the conventional BA control field 42 in FIG. 5. Similar to the sender, the receiver uses the Multi-TID BA control field 90 to signal the sender of the presence of the Multi-TID-BA scheme. The compressed BA subfield 92 (bit B2) of the Multi-TID BA control field 90 is copied into a reserved field 94 (bit B3). The compressed BA subfield 92 is set to 0. A TID_INFO field 96 (bits B12, B13, B14, B15) is copied twice into two reserved subfields 98 and 100 (bits B4, B5, B6, B7 and B8, B9, B10, B11, respectively). The TID_INFO field 96 represents the number of TIDs indicated in the Multi-TID BA 80 (i.e., the number of 1's in the TID-Bitmap field 86).

The data sender uses the above signaling in the Multi-TID BA control field 90 from the data receiver to detect the Multi-TID-BA scheme, and appropriately interpret the Multi-TID BA frame 80.

In an example where a data A-MPDU comprises MPDUs from five different TIDs, the length of a conventional acknowledgment frame can be computed as follows:

$$\text{Compressed } BA \ A\text{-}MPDU \text{ frame size} =$$
$$\text{number of } BAs * \text{Compressed } BA \text{ Frame size} +$$
$$(\text{number of } BAs - 1) * A\text{-}MPDU \text{ delimiter} =$$
$$5 * \text{Compressed } BA \text{ frame size} + 4 * A\text{-}MPDU \text{ delimiter} =$$
$$5 * 32 + 4 * 4 = 160 + 16 = 176 \text{ bytes (i.e., less than the size}$$
$$\text{of a Multi-}TID \ BA \text{ frame which is 184 bytes).}$$

In another example where a data A-MPDU comprises MPDUs from five different TIDs, the length of a conventional acknowledgment frame can be computed as follows:

$$\text{Compressed } BA \ A\text{-}MPDU \text{ frame size} =$$
$$\text{number of } BAs * \text{Compressed } BA \text{ Frame size} +$$
$$(\text{number of } BAs - 1) * A\text{-}MPDU \text{ delimiter} =$$
$$6 * \text{Compressed } BA \text{ frame size} + 5 * A\text{-}MPDU \text{ delimiter} =$$
$$6 * 32 + 5 * 4 = 192 + 20 = 212 \text{ bytes (i.e., greater than the size}$$
$$\text{of a Multi-}TID \ BA \text{ frame which is 184 bytes).}$$

Using a Multi-TID-BA scheme, according to the present invention, is more efficient when the number of TIDs is more than five. In one example, as long as the number of TIDs is less than five, the sender need not utilize Multi-TID-BA signaling in a BAR (i.e., the sender sends a conventional BAR 40 in FIG. 4 rather than a Multi-TID BAR 60 in FIG. 9). This prompts the receiver to use a conventional acknowledgment frame (i.e., the receiver sends back a conventional BA 50 in FIG. 7, rather than a Multi-TID BA frame 80 in FIG. 11). According to further embodiments of the present invention as described below, a combination BA scheme can be implemented wherein: (1) when the number of TIDs is five or less, the sender and the receiver use conventional BAR and BA schemes (i.e., the sender sends conventional BARs 40 and the receiver responds with conventional BAs 50); and (2) when the number of TIDs is more than five, the sender switches to Multi-TID BAR signaling (i.e., Multi-TID BAR 60 in FIG. 9), and the receiver switches to the Multi-TID BA signaling (i.e., Multi-TID BA frame 80 in FIG. 11).

FIGS. 14 and 15 show examples of process for operations of a data sender and a data receiver, respectively, according to further embodiments of the present invention. Specifically, FIG. 14 shows a process 150 implemented by a wireless communication station in a wireless local area network (WLAN), such as an IEEE 802.11n network. A wireless communication station (e.g., an access point (AP) or a station (STA)) is capable of transmitting and/or receiving over a wireless channel. Such a wireless communication station has a MAC layer and a PHY layer, and can function as a sender, a receiver, an initiator and/or a responder.

The process 150 for an AP or a STA that functions as a sender includes the following steps:

Step 200: Await data from higher layer(s) into the MAC layer of the sender.

Step 202: Determine if the sender is to transmit data based on a communication scheme that includes a Multi-TID-BA scheme. In one example this is determined based on prior knowledge that the receiver is Multi-TID-BA capable. Further for efficiency, as described, a Multi-TID-BA scheme is utilized when there are more than five TIDs from which data is to be included in an A-MPDU. If the sender is to transmit data based on a communication scheme that includes a Multi-TID-BA scheme, then go to step 206, otherwise go to step 204.

Step 204: Use standard A-MPDU transmission. Go back to step 200.

Step 206: Construct an A-MPDU from multiple MPDUs, wherein a TID_NUM variable represents the count of different TIDs from which data is included in the A-MPDU.

Step 208: Send the A-MPDU frame to the PHY layer to transmit to the receiver over a wireless channel.

Step 210: If the number of TIDs, TID_NUM, is greater than 0, then go to step 212, otherwise go back to step 200.

Step 212: Construct a Multi-TID Block Acknowledgement Request (i.e., the Multi-TID BAR 60 in FIG. 9).

Step 214: Set the Multi-TID BAR control subfield 62 of the Multi-TID BAR 60 to signal a Multi-TID-BA scheme as described above (FIG. 10). The TID_INFO subfield 68 is set to the actual value of the TID.

Step 216: Set the BA Starting Sequence Control field 61 in the Multi-TID BAR 60 according to the IEEE 802.11 standard.

Step 218: Send the Multi-TID BAR 60 to the PHY layer to transmit to the receiver over a wireless channel.

Step 220: Subtract one from TID_Num (i.e., TID_Num--). Go back to step 210 to process any remaining TIDs.

FIG. 15 shows a process 250 implemented by a wireless communication station in a WLAN, such as an IEEE 802.11n network. The wireless communication station (AP or STA) functions as a receiver and receives A-MPDUs from the sender. The process 250 includes the following steps:

Step 300: Await the arrival of a data frame from the PHY layer into the MAC layer at the receiver.

Step 302: Determine if the received frame is an A-MPDU? If yes, go to step 304, otherwise, go back to step 300.

Step 304: Process the A-MPDU by accounting for all BAR frames corresponding to all MPDUs in the A-MPDU.

Step 306: Determine if all BAR frames received in the A-MPDU have been responded to. If yes, go to step 307, otherwise go to step 308 to process a remaining BAR frame.

Step 307: Transmit a constructed Multi-TID BA frame response to the sender. Go to step 300.

Step 308: Determine if the BAR frame includes Multi-TID-BA signaling by checking the Multi-TID BAR control field 62 (FIG. 10). Specifically, the receiver determines if both B2 and B3 bits are 0, and that the binary representation of bits B4 . . . B7, B8 . . . B11, and B12 . . . B15, has the same value. If not, the BAR frame does not include Multi-TID-BA signaling, so go to step 310. Otherwise, go to step 312.

Step 310: Generate a normal (conventional) acknowledgement (e.g., according to the aforementioned IEEE 802.11n specification), and go to step 306.

Step 312: If a new Multi-TID BA frame has not already been constructed, then construct a new Multi-TID BA frame 80 (FIG. 11).

Step 314: Update the Multi-TID BA control field 90 (FIG. 11) by incrementing the TID_INFO field 96 (FIG. 13) Multi-TID BA control field 90 by one. Set the Multi-TID BA signaling bits as shown in FIG. 13, described above.

Step 316: For a TID, set the Block ACK Starting Sequence Control 82 and the corresponding Block ACK Bitmap subfield 84 of the Multi-TID BA frame 80, as discussed above.

Step 318: Set a bit corresponding to the current TID in the TID-Bitmap subfield 96 (FIG. 12) of the Multi-TID BA frame 80 to 1, to indicate the presence of the TID in step 316. Go to step 306 to process any remaining BAR frames.

According to further embodiments of the present invention, a variant of the aforementioned Multi-TID-BA scheme can be utilized; wherein the need for a per TID Info field 44 in the BAR frame 40 (FIG. 4) is eliminated. This results in reducing the size of BAR frames 60. The variant Multi-TID-BA scheme uses variable length BAR and BA control frames, making it more efficient in terms of actual number of bytes transmitted over the channel. Only one BAR control frame is transmitted for all TIDs. FIG. 16 shows the format of variable size Multi-TID BAR frame 320, wherein the Per TID Info subfield is removed. A Multi-TID BAR control field 322 is similar to the Multi-TID BAR control field 62 (FIG. 9), except that the TID_INFO value Multi-TID BAR control field 322 indicates the total number of TIDs. The purpose of the Multi-TID BAR control subfield 322 is to convey appropriate BA signaling from the sender to the receiver. The requirement for repetition of Per Info TID subfield 44 (FIG. 4) is eliminated. Thus, in comparison with the conventional Multi-TID BAR control frame, the Multi-TID BAR control frame 320 is 30 bytes smaller. This provides more efficient communication.

FIG. 17 shows a variable length BA frame 330 as described. The receiver generates the variable size Multi-TID BA frame 330, wherein for each TID, a Block ACK Starting Sequence Control 332 and a Block ACK Bitmap 334, are included in the Multi-TID BA frame 330, making the Multi-TID BA frame 334 of a variable length based on the number of TIDs. The Multi-TID BA control field 338 is similar to the Multi-TID BA control field 90 in FIG. 11.

FIG. 18 shows an example of variable length Multi-TID BA frame 340, wherein three TIDs (0, 5 and 8) are indicated in the TID Bitmap 342. Furthermore, a pair of Block ACK Starting Sequence Control 344 and Compressed Block ACK Bitmap 346 subfields, for each TID, is included in the Multi-TID BA frame 340. Such a variable length Multi-TID-BA scheme can be implemented for both PSMP and non-PSMP stations.

FIG. 19 shows a flowchart of a process 350 for operation of a sender using a variable length Multi-TID-BA scheme, which includes the steps of:

Step 400: Await data from higher layer(s) into the MAC layer of the sender.

Step 402: Determine if the sender is to transmit data based on a communication scheme that includes a Multi-TID-BA scheme. In one example this is determined based on prior knowledge that the receiver is Multi-TID-BA capable. If the sender is to transmit data based on a communication scheme that includes a Multi-TID-BA scheme, then go to step 406, otherwise go to step 404.

Step 404: Use standard A-MPDU transmission. Go to step 400.

Step 406: Construct an A-MPDU from multiple MPDUs, wherein a TID_NUM variable represents the count of different TIDs from which data is included in the A-MPDU.

Step 408: Send the A-MPDU frame to the PHY layer to transmit to the receiver over a wireless channel.

Step 409: Construct a Multi-TID BAR frame 320 as shown in FIG. 16.

Step 410: If the number of TIDs (TID_NUM) is greater than 0, then go to step 412, otherwise go back to step 414.

Step 412: Send a constructed Multi-TID BAR frame 320 to the PHY layer for transmission to the receiver. Go to step 400.

Step 414: Update the Multi-TID BAR control field 322 by incrementing the TID_INFO therein by 1.

Step 416: Set a bit corresponding to the current TID in the TID-Bitmap subfield 323 of the Multi-TID BAR frame 320.

Step 418: Append a Starting Sequence control subfield to the Multi-TID BAR frame 320 (e.g., Starting Sequence control subfield 344 in the Multi-TID BAR frame 340).

Step 420: Subtract one from TID_Num (i.e., TID_Num-). Go to step 410 to process any remaining TIDs.

FIG. 20 shows a flowchart of a process 450 for operation of a receiver using a variable length Multi-TID-BA scheme, which includes the steps of:

Step 500: Await arrival of a data frame from the PHY layer into the MAC layer at the receiver.

Step 502: Determine if the received frame is an A-MPDU? If yes, go to step 504, otherwise, go back to step 500.

Step 504: Process the A-MPDU by accounting for all BAR frames corresponding to all MPDUs in the A-MPDU.

Step 506: Determine if a BAR frame of an A-MPDU frame is received? If not, go to step 500, otherwise go to step 508.

Step 508: Determine if the BAR frame includes Multi-TID-BA signaling by checking the Multi-TID BAR control field 322 (FIG. 16). Specifically, the receiver determines if both B2 and B3 bits are 0, and that the binary representation of bits B4 . . . B7, B8 . . . B11, and B12 . . . B15, has the same value. If not, the BAR frame does not include Multi-TID-BA signaling, go to step 510. Otherwise go to step 514.

Step 510: Generate a normal (conventional) acknowledgement (e.g., according to the aforementioned IEEE 802.11n specification), and go to step 512.

Step 512: Send constructed BA frame response to the receiver. Go back to step 500.

Step 514: Set TID_Num variable as the number of 1's in the TID Bitmap 323 of the Multi-TID BAR 320 (FIG. 16).

Step 516: If a new Multi-TID BA frame has not already been constructed, then construct a new Multi-TID BA frame 330 (FIG. 17), otherwise use the existing one. Set Multi-TID-BA signaling bits in the Multi-TID BA control field 338 (similar to FIG. 13).

Step 518: Determine if TID_Num>0 (i.e., any TID remaining)? If not, go to step 512, otherwise go to step 520.

Step 520: Update the Multi-TID BA control field 338 by setting a bit corresponding to the current TID in the TID-Bitmap field 342 (FIG. 18) to 1 to indicate the presence of the TID.

Step 522: Append and appropriately set Block ACK Starting Sequence Control 344 and Compressed Block ACK Bitmap 346 (FIG. 18) in the Multi-TID BA frame 342.

Step 524: Decrement TID_Num by one, and go back to step 518 to process any remaining BAR frames.

FIG. 21 shows a functional block diagram of a wireless communication system 600, such as a type of IEEE 802.11 WLAN, implementing a Multi-TID-BA scheme, according to an embodiment of the present invention. The system 600 includes a sender 602 and a receiver 604. Though one sender and one receiver are shown those skilled in the art will recognize that the present invention is useful for multiple senders and receivers. The sender 602 and the receiver 604 are wireless communication stations as described further above. For example, the sender 602 can function as an AP and the receiver 604 can function as a STA.

The sender 602 comprises a PHY layer 606 and a MAC layer 608, and the receiver 604 comprises a PHY layer 616 and a MAC layer 618. In this example, the sender 602 and the receiver 604 utilize a type of IEEE 802.11n standard, modified to implement a Multi-TID-BA scheme according to an embodiment of the present invention.

In the receiver 602, the MAC layer 608 comprises a data packaging module 610 including a frame constructor 612 and a BAR controller 614. The frame constructor 612 constructs A-MPDUs from incoming MSDUs, and the BAR controller generates requests including BAR frames (Multi-TID BAR) for the corresponding TIDs in the A-MPDU, as described above.

In the receiver 604, the MAC layer 618 comprises a data package processing module 620 including a frame processor 622 and a BA controller 624. The frame processor 622 analyzes incoming A-MPDUs for accuracy (e.g., using CRC values placed therein by the sender), and the BA controller 624 generates a single block acknowledgement (Multi-TID BA) in response to the BARs, as described above. As such, the data packaging module 610 of the sender 602 and the data package processing module 620 of the receiver 604 implement the above described processes according to an embodiment of the present invention. Upon receiving the block acknowledgment from the receiver, a retransmitter module 607 detects in the sender 602 Multi-TID-BA signaling from the received block acknowledgement, and retransmits each MPDU that requires retransmission as indicated by the corresponding acknowledgment in the block acknowledge.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of packet communication in a wireless communication system including a sender and a receiver, comprising:
    aggregating multiple Media Access Control (MAC) Protocol Data Units (MPDUs), each having one or more corresponding identifications;
    for each identification, generating a block acknowledgment request (BAR) without a traffic identifier value (PER TID_INFO) field, to request an acknowledgment for each MPDU from the receiver to request an acknowledgment for one or more MPDUs with that identification from the receiver;
    transmitting the aggregated MPDUs and the BARs from the sender to the receiver over a wireless channel;
    receiving the aggregated MPDUs and the BARs at the receiver;
    in response to the BARs, generating a single block acknowledgement that includes an acknowledgment for each MPDU with a different identification; and
    transmitting the block acknowledgement to the sender.

2. The method of claim 1 wherein:
    the identification comprises a Traffic Identifier (TID); and
    generating the BAR further includes:
    generating a BAR for each TID by generating a separate BAR for one or more MPDUs of each TID; and
    transmitting the aggregated MPDUs and the BARs further comprises transmitting a separate BAR for each TID.

3. The method of claim 2 wherein generating a BAR for each TID further includes including signaling information in that BAR to indicate a multiple TID BAR (Multi-TID BAR), which notifies the receiver to generate a single block acknowledgement including an acknowledgment for each MPDU with a different TID.

4. The method of claim 3 wherein:
    each Multi-TID BAR includes a Multi-TID BAR control field; and
    including signaling information further comprises including said signaling information in the Multi-TID BAR control field of each Multi-TID BAR.

5. The method of claim 4 wherein the step of including said signaling information in the Multi-TID BAR control field further includes:
    setting a compressed BA subfield, B2, of the Multi-TID BAR to 0;
    copying the compressed BA subfield, B2, of the Multi-TID BAR into a reserved field (B3); and
    copying a TID INFO field (B12, B13, B14, B15) of the Multi-TID BAR twice into a reserved field (B4,B5,B6, B7 and B8, B9, B10, B11).

6. The method of claim 4 further comprising the receiver detecting the signaling in each Multi-TID BAR from the sender, such that generating a single block acknowledgement further includes, upon detecting said signaling, generating a single multiple TID BA (Multi-TID BA) in response to the Multi-TID BARs for the MPDU aggregation, wherein the Multi-TID BA includes an acknowledgment for each MPDU in the MPDU aggregation.

7. The method of claim 6 wherein the Multi-TID BA further includes a TID-Bitmap field that indicates the presence or absence of acknowledgements corresponding to each TID, in response to the Multi-TID BARs for the MPDU aggregation.

8. The method of claim 7 wherein the Multi-TID BA further includes a Multi-TID BA control field, and the method further comprising the step of the receiver including signaling in the Multi-TID BA control field to notify the sender that the Multi-TID BA comprises a single block acknowledgement in response to the Multi-TID BARs for the MPDU aggregation, wherein the Multi-TID BA includes an acknowledgment for each MPDU in the transmitted MPDU aggregation.

9. The method of claim 8 wherein including signaling in the Multi-TID BA control field further includes:
setting a compressed BA subfield, B2, of the Multi-TID BA control field to 0;
copying the compressed BA subfield, $B_2$, of the Multi-TID BA control field into the reserved field (B3); and
copying a TID INFO field (B12, B13, B14, B15) twice into the reserved fields (B4,B5,B6,B7 and B8, B9, B10, B11).

10. The method of claim 8 further comprising the sender detecting the signaling in the Multi-TID BA from the receiver, checking the acknowledgment for each MPDU, and retransmitting each MPDU that requires retransmission as indicated by the corresponding acknowledgment in the block acknowledge.

11. The method of claim 1 wherein:
the identification comprises a Traffic Identifier (TID); and
each BAR and each block acknowledgement is of a fixed length.

12. The method of claim 1 further comprising the sender retransmitting each MPDU that requires retransmission as indicated by the corresponding acknowledgment in the block acknowledgement.

13. A method of packet communication in a wireless communication system including a sender and a receiver, comprising:
aggregating multiple Media Access Control (MAC) Protocol Data Units (MPDUs) having a plurality of different Traffic Identifiers (TIDs);
generating a block acknowledgement request (BAR) without a traffic identifier value (PER TID_INFO) field to request an acknowledgment for each MPDU from the receiver, the length of the BAR is variable and is a function of the number of TIDs present in the MPDU aggregation;
transmitting the aggregated MPDUs and the BAR from the sender to the receiver over a wireless channel;
receiving the aggregated MPDUs and the BAR at the receiver;
in response to the BAR, generating a single block acknowledgement that includes an acknowledgment for each MPDU with a different identification comprising a TID, where the length of the block acknowledgement is variable and is a function of the number of TIDs present in the MPDU aggregation; and
transmitting the block acknowledgement to the sender.

14. The method of claim 13 further comprising the sender retransmitting each MPDU that requires retransmission as indicated by the corresponding acknowledgment in the block acknowledge.

15. A wireless communication system comprising:
a wireless sender and a wireless receiver, wherein the wireless sender includes:
a frame constructor that is configured to aggregate multiple Media Access Control (MAC) Protocol Data Units (MPDUs) having a plurality of different Traffic Identifiers (TIDs);
a request generator that is configured such that for each TID, the request generator generates a block acknowledgement request (BAR) without a traffic identifier value (PER TID_INFO) field to request an acknowledgment for one or more MPDUs with that TID from the receiver; and
a transmission module that is configured to transmit the aggregated MPDUs and the BARs from the sender to the receiver over a wireless channel; and
wherein the wireless receiver includes:
a receiving module that is configured to receive the aggregated MPDUs and the BARs;
a frame processor that is configured to check the aggregated MPDUs for accuracy; and
an acknowledgment module that is configured such that in response to the BARs, the acknowledgment module generates a single block acknowledgement including an acknowledgment for each MPDU with a different TID, for transmission to the sender.

16. The system of claim 15 wherein the request generator is further configured to generate a separate BAR for one or more MPDUs of each TID.

17. The system of claim 16 wherein the request generator is further configured to include signaling information in each BAR to indicate a Multi-TID BAR, which notifies the receiver to generate a single block acknowledgement including an acknowledgment for each MPDU with a different TID.

18. The system of claim 17 wherein:
each Multi-TID BAR includes a Multi-TID BAR control field; and
the request generator is further configured to include said signaling information in the Multi-TID BAR control field of each Multi-TID BAR.

19. The system of claim 18 wherein the request generator is further configured to include said signaling information in the Multi-TID BAR control field by:
setting a compressed BA subfield, $B_2$, of the Multi-TID BAR to 0;
copying the compressed BA subfield, B2, of the Multi-TID BAR into a reserved field (B3); and
copying a TID_INFO field (B12, B13, B14,B15) of the Multi-TID BAR twice into a reserved field (B4,B5,B6, B7 and B8, B9, B10, B11).

20. The system of claim 18 wherein:
the frame processor is further configured to detect the signaling in each Multi-TID BAR from the sender, and to inform the acknowledgment module to generate a single Multi-TID BA in response to the Multi-TID BARs for the MPDU aggregation, wherein the Multi-TID BA includes an acknowledgment for each MPDU in the MPDU aggregation.

21. The system of claim 20 wherein the Multi-TID BA further includes a TID-Bitmap field that indicates the presence or absence of acknowledgements corresponding to each TID, in response to the Multi-TID BARs for the MPDU aggregation.

22. The system of claim 21 wherein the Multi-TID BA further includes a Multi-TID BA control field, and the acknowledgment module is further configured to include signaling in the Multi-TID BA control field to notify the sender that the Multi-TID BA comprises a single block acknowledgement in response to the Multi-TID BARs for the MPDU aggregation, wherein the Multi-TID BA includes an acknowledgment for each MPDU in the transmitted MPDU aggregation.

23. The system of claim 22 wherein an acknowledgment module is further configured to include signaling in the Multi-TID BA control field by:
setting a compressed BA subfield, $B_2$, of the Multi-TID BA control field to 0;

copying the compressed BA subfield, B2, of the Multi-TID BA control field into the reserved field (B3); and copying a TID INFO field (B12, B13, B14,B15) twice into the reserved fields (B4,B5,B6,B7 and B8, B9, B10, B11).

24. The system of claim 22 wherein the sender further includes a retransmitter module that is configured to detect the signaling in the Multi-TID BA from the receiver, check the acknowledgment for each MPDU, and retransmit each MPDU that requires retransmission as indicated by the corresponding acknowledgment in the block acknowledge.

25. The system of claim 15 wherein each BAR and each block acknowledgement is of a fixed length.

26. A wireless communication system comprising:
a wireless sender and a wireless receiver, wherein the wireless sender includes:
   a frame constructor that is configured to aggregate multiple Media Access Control (MAC) Protocol Data Units (MPDUs) having a plurality of different Traffic Identifiers (TIDs);
   a request generator that is configured to generate a block acknowledgement request (BAR) without a traffic identifier value (PER TID_INFO) field, to request an acknowledgment for each MPDU from the receiver; and
   a transmission module that is configured to transmit the aggregated MPDUs and the BAR from the sender to the receiver over a wireless channel; and
wherein the wireless receiver includes:
   a receiving module that is configured to receive the aggregated MPDUs and the BAR;
   a frame processor that is configured to examine the aggregated MPDUs for accuracy; and
   an acknowledgment module that is configured such that in response to the BAR, the acknowledgment module generates a single block acknowledgement that includes an acknowledgment for each MPDU with a different TID, for transmission to the sender.

27. The system of claim 26 wherein:
the length of the BAR is variable and is a function of the number of TIDs represented in the MPDU aggregation; and
the length of the block acknowledgement is variable and is a function of the number of TIDs represented in the MPDU aggregation.

28. The system of claim 27 wherein the sender further includes a retransmitter module that is configured to retransmit each MPDUs that requires retransmission as indicated by the corresponding acknowledgment in the block acknowledge.

29. A wireless sender for data communication with a wireless receiver, the wireless sender comprising:
   a frame constructor that is configured to aggregate multiple Media Access Control (MAC) Protocol Data Units (MPDUs) having a plurality of different Traffic Identifiers (TIDs);
   a request generator that is configured such that for each TID, the request generator generates a block acknowledgement request (BAR) without a traffic identifier value (PER TID_INFO field to request an acknowledgment for one or more MPDUs with that TID from the receiver, in the form of a single block acknowledgment from the receiver that includes acknowledgments for all the MPDUs in the aggregation; and
   a transmission module that is configured to transmit the aggregated MPDUs and the BARs from the sender to the receiver over a wireless channel.

30. The wireless sender of claim 29 wherein the request generator is further configured to generate a separate BAR for one or more MPDUs of each TID.

31. The wireless sender of claim 30 wherein the request generator is further configured to include signaling information in each BAR to indicate a Multi-TID BAR, which notifies the receiver to generate a single block acknowledgement including an acknowledgment for each MPDU with a different TID.

32. The wireless sender of claim 31 wherein:
   each Multi-TID BAR includes a Multi-TID BAR control field; and
   the request generator is further configured to include said signaling information in the Multi-TID BAR control field of each Multi-TID BAR.

33. The wireless sender of claim 32 wherein the request generator is further configured to include said signaling information in the Multi-TID BAR control field by:
   setting a compressed BA subfield, $B_2$, of the Multi-TID BAR to 0;
   copying the compressed BA subfield, B2, of the Multi-TID BAR into a reserved field (B3); and
   copying a TID INFO field (B12, B13, B14, B15) of the Multi-TID BAR twice Into a reserved field (B4,B5,B6, B7 and B8, B9, B10, B11).

34. The wireless sender of claim 29 further comprising a retransmitter module that is configured to check the acknowledgment for each MPDU, and retransmit each MPDU that requires retransmission as indicated by the corresponding acknowledgment in the block acknowledge.

35. The wireless sender of claim 29 wherein each BAR and each block acknowledgement is of a fixed length.

36. A wireless sender for data communication with a wireless receiver, the wireless sender comprising:
   a frame constructor that is configured to aggregate multiple Media Access Control (MAC) Protocol Data Units (MPDUs) having a plurality of different Traffic Identifiers (TIDs);
   a request generator that is configured to generate a block acknowledgement request (BAR) without a traffic identifier value (PER TID_INFO) field, to request an acknowledgment for each MPDU from the receiver, in the form of a single block acknowledgment from the receiver that includes acknowledgments for all the MPDUs in the aggregation; and
   a transmission module that is configured to transmit the aggregated MPDUs and the BAR from the sender to the receiver over a wireless channel.

37. The wireless sender of claim 36 wherein:
the length of the BAR is variable and is a function of the number of TIDs represented in the MPDU aggregation; and
the length of the block acknowledgement is variable and is a function of the number of TIDs represented in the MPDU aggregation.

38. The wireless sender of claim 37 wherein the sender further includes a retransmitter module that is configured to retransmit each MPDU that requires retransmission as indicated by the corresponding acknowledgment in the block acknowledge.

39. A wireless receiver for communication with a wireless sender, the wireless receiver comprising:
   a receiving module that is configured to receive the aggregated Media Access Control (MAC) Protocol Data Units (MPDUs) and corresponding block acknowledgement requests (BARs) each without a traffic identifier value (PER TID_INFO) field, wherein the MPDUs have a plurality of different Traffic Identifiers (TIDs), and each BAR requests an acknowledgment for one or more MPDUs with that TID in the aggregated MPDUs;

a frame processor that is configured to check the aggregated MPDUs for accuracy; and an acknowledgment module that is configured such that in response to the BARs, the acknowledgment module generates a single block acknowledgement including an acknowledgment for each MPDU with a different TID, for transmission to the sender.

40. The wireless receiver of claim 39 wherein:

the frame processor is further configured to detect Multi-TID signaling in each BAR from the sender, and to inform the acknowledgment module to generate a single Multi-TID BA in response to Multi-TID BARs for the MPDU aggregation, wherein the Multi-TID BA includes an acknowledgment for each MPDU in the MPDU aggregation.

41. The wireless receiver of claim 40 wherein the Multi-TID BA further includes a TID-Bitmap field that indicates the presence or absence of acknowledgements corresponding to each TID, in response to the Multi-TID BARs for the MPDU aggregation.

42. The wireless receiver of claim 41 wherein the Multi-TID BA further includes a Multi-TID BA control field, and the acknowledgment module is further configured to include signaling in the Multi-TID BA control field to notify the sender that the Multi-TID BA comprises a single block acknowledgement in response to the Multi-TID BARs for the MPDU aggregation, wherein the Multi-TID BA includes an acknowledgment for each MPDU in the transmitted MPDU aggregation.

43. The wireless receiver of claim 40 wherein:

the length of a BAR is variable as a function of the number of TIDs represented in the MPDU aggregation; and the length of the block acknowledgement is variable as a function of the number of TIDs represented in the MPDU aggregation.

44. A wireless receiver for communication with a wireless sender, the wireless receiver comprising:

a receiving module that is configured to receive the aggregated Media Access Control (MAC) Protocol Data Units (MPDUs) and a corresponding block acknowledgement request (BAR) without a traffic identifier value (PER TID_INFO) field, wherein the MPDUs have a plurality of different Traffic Identifiers (TIDs), and the BAR requests an acknowledgment for the MPDUs in the aggregated MPDUs;

a frame processor that is configured to check the aggregated MPDUs for accuracy; and an acknowledgment module that is configured such that in response to the BAR, the acknowledgment module generates a single block acknowledgement including an acknowledgment for each MPDU with a different TID, for transmission to the sender.

45. The wireless receiver of claim 44 wherein:

the frame processor is further configured to detect Multi-TID signaling in the BAR from the sender, and to inform the acknowledgment module to generate a single Multi-TID BA in response to the Multi-TID BAR for the MPDU aggregation, wherein the Multi-TID BA includes an acknowledgment for each MPDU in the MPDU aggregation.

46. The wireless receiver of claim 45 wherein the Multi-TID BA further includes a TID-Bitmap field that indicates the presence or absence of acknowledgements corresponding to each TID, in response to the Multi-TID BAR for the MPDU aggregation.

47. The wireless receiver of claim 46 wherein the Multi-TID BA further includes a Multi-TID BA control field, and the acknowledgment module is further configured to include signaling in the Multi-TID BA control field to notify the sender that the Multi-TID BA comprises a single block acknowledgement in response to the Multi-TID BAR for the MPDU aggregation, wherein the Multi-TID BA includes an acknowledgment for each MPDU in the transmitted MPDU aggregation.

48. A method of packet communication in a wireless communication system including a sender and a receiver, comprising:

aggregating multiple Media Access Control (MAC) Protocol Data Units (MPDUs), each having one or more corresponding identifications, where the identification comprises a Traffic Identifier (TID);

for each identification, generating a block acknowledgment request (BAR) to request an acknowledgment for each MPDU from the receiver to request an acknowledgment for one or more MPDUs with that identification from the receiver, wherein generating the BAR further includes:

generating a BAR for each TID by generating a separate BAR for one or more MPDUs of each TID, and including signaling information in that BAR to indicate a multiple TID BAR (Multi-TID BAR), which notifies the receiver to generate a single block acknowledgement including an acknowledgment for each MPDU with a different TID, wherein each Multi-TID BAR includes a Multi-TID BAR control field, and including signaling information further comprises including said signaling information in the Multi-TID BAR control field of each Multi-TID BAR by:

setting a compressed BA subfield, B2, of the Multi-TID BAR to 0;

copying the compressed BA subfield, B2, of the Multi-TID BAR into a reserved field (B3); and copying a TID INFO field (B12, B13, B14, B15) of the Multi-TID BAR twice into a reserved field (B4,B5,B6, B7 and B8, B9, B10, B11); and transmitting the aggregated MPDUs and the BARs further comprises transmitting a separate BAR for each TID;

transmitting the aggregated MPDUs and the BARs from the sender to the receiver over a wireless channel;

receiving the aggregated MPDUs and the BARs at the receiver;

in response to the BARs, generating a single block acknowledgement that includes an acknowledgment for each MPDU with a different identification; and transmitting the block acknowledgement to the sender.

* * * * *